United States Patent [19]

Carley et al.

[11] 4,200,022
[45] Apr. 29, 1980

[54] ENVELOPE CONTROL CAUSING DAMPER EFFECT ON PERCUSSIVE VOICES OF ELECTRONIC MUSICAL INSTRUMENT

[75] Inventors: Joseph C. Carley, Sycamore; Anthony C. Ippolito, DeKalb, both of Ill.

[73] Assignee: The Wurlitzer Company, DeKalb, Ill.

[21] Appl. No.: 917,295

[22] Filed: Jun. 20, 1978

[51] Int. Cl.² .................... G10H 1/02; G10H 5/00
[52] U.S. Cl. .................................. 84/1.26; 84/1.13; 307/246; 307/294
[58] Field of Search ............... 84/1.13, 1.26; 307/246, 307/294

[56] References Cited

U.S. PATENT DOCUMENTS

| | | | |
|---|---|---|---|
| 3,180,919 | 4/1965 | Stiefel | 84/1.26 |
| 3,383,453 | 5/1968 | Sharp | 84/1.26 |
| 3,435,123 | 3/1969 | Schrecongost | 84/1.26 |
| 3,465,088 | 9/1969 | Kohls | 84/1.26 |
| 3,493,668 | 2/1970 | Bunger | 84/1.13 |
| 3,509,263 | 4/1970 | Cordry | 84/1.13 |
| 3,544,699 | 12/1970 | Harris | 84/1.26 |
| 3,627,897 | 12/1971 | Harris | 84/1.13 X |
| 3,816,636 | 6/1974 | Peltz | 84/1.13 X |
| 3,821,459 | 6/1974 | Schrecongost | 84/1.13 |
| 3,848,142 | 11/1974 | Adachi | 307/294 |
| 3,924,505 | 12/1975 | Schrecongost | 84/1.13 X |
| 3,935,783 | 2/1976 | Machanian et al. | 84/1.13 X |
| 3,971,284 | 7/1976 | Schreier | 84/1.26 |
| 4,067,253 | 1/1978 | Wheelwright et al. | 84/1.13 X |
| 4,085,374 | 4/1978 | Nagahama | 307/246 X |

*Primary Examiner*—S. J. Witkowski
*Attorney, Agent, or Firm*—Trexler, Wolters, Bushnell & Fosse, Inc.

[57] ABSTRACT

A large scale integrated circuit chip is provided with internal tone generators and digital attack and decay features interconnected with external capacitors for controlling the attack and decay of tones. External diodes are wired to the chip and to the external capacitors and have a circuit completed by a damper switch. According to the position of the switch the capacitors will discharge slowly for long sustain of tones, or will discharge very rapidly through an additional discharge path on the chip upon key release to produce very rapid decay.

7 Claims, 10 Drawing Figures

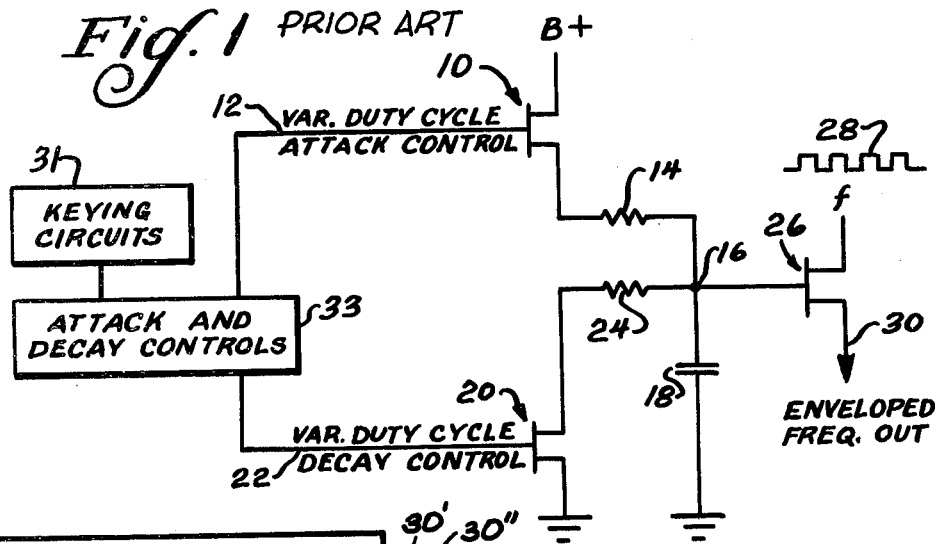

$B+ = V+$     $B+ > V+$
DAMPER SWITCH
CLOSED –
KEY HIT AND
RELEASED
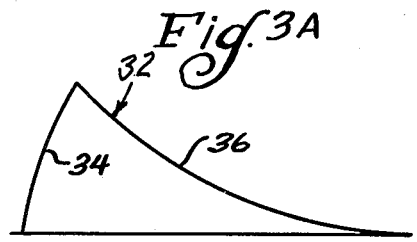 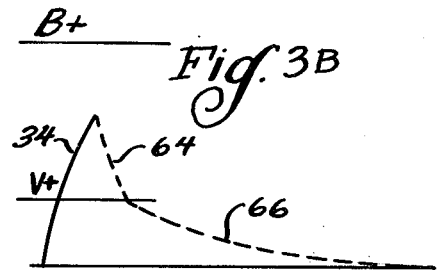
DAMPER SWITCH
CLOSED –
KEY HIT AND
HELD
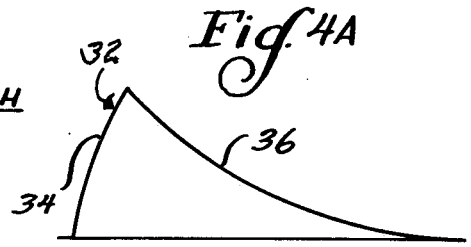 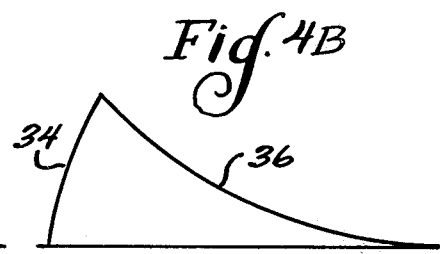
DAMPER SWITCH
OPEN –
KEY HIT AND
RELEASED
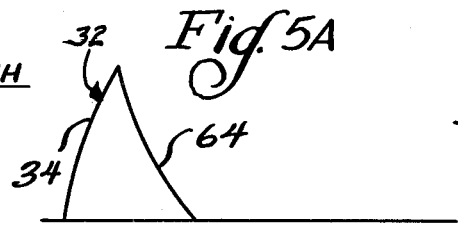 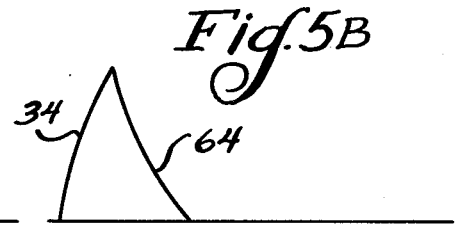
DAMPER SWITCH
OPEN –
KEY HIT AND
HELD
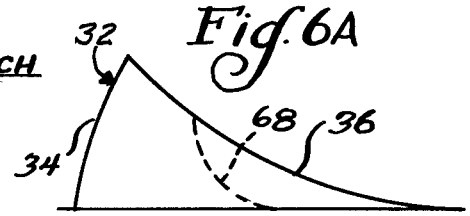 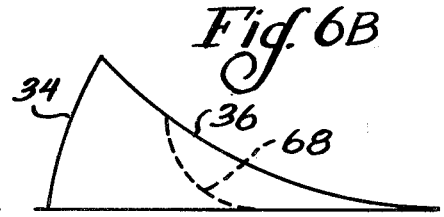

ENVELOPE CONTROL CAUSING DAMPER EFFECT ON PERCUSSIVE VOICES OF ELECTRONIC MUSICAL INSTRUMENT

BACKGROUND OF THE INVENTION

In the copending application of William R. Hoskinson for "Digital Control Of Attack And Decay" Ser. No. 917,308, filed June 20, 1978 assigned to the same assignee as the present application, namely The Wurlitzer Company of DeKalb, Ill. circuits are disclosed for utilizing digital signals of variable duty cycle to control the attack and decay of an electrical wave representing a musical tone. In accordance with that disclosure once suitable adjustments are made to the musical instrument the attack characteristics and the decay characteristics remain fixed until further adjustments are made.

There are times, the simulation of piano tones being a specific example, in which it may be desired to have a very slow decay time, i.e. a long sustain, as long as a key is held depressed. However, immediately upon release of a key it is desired that the tone should decay very rapidly.

OBJECTS AND BRIEF DISCLOSURE OF THE PRESENT INVENTION

It is a principle object of the present invention to utilize existing LSI chip construction in accordance with the aforesaid Hoskinson copending application with the addition of a minimal number of external parts to provide for a long sustain (slow decay) with optional very short sustain upon key release.

More specifically, it is an object of the present invention to use an LSI chip with internal charge and discharge paths for external capacitors which control the attack and decay of electric waves representing musical tones in combination with external diodes and switchable biasing means therefor to control second discharge paths internally of the chip to effect long or short sustain upon key closure in accordance with the biasing of said diodes.

In accordance with the aforesaid Hoskinson patent application there are external capacitors which are charged and discharged internally of an LSI chip and which control the attack and decay of an electric wave representing a musical tone. In accordance with the present invention an additional discharge path is provided through an existing circuit in the LSI chip under the control of external diodes with a switchable potential applied thereto. In accordance with one condition of biasing of the diodes the capacitors discharge through their own normal discharge paths internally of the LSI chip, thus producing a long sustain. However, in accordance with a different condition of biasing of the diodes additional discharge paths are placed in parallel with the normal discharge paths internally of the LSI chip to produce very rapid discharge of the capacitors, and concomitant very short sustain upon key release.

DESCRIPTION OF THE DRAWINGS

Objects and advantages of the present invention will be understood best with regard to the following description when taken in accompaniment with the drawings wherein:

FIG. 1 is a partial schematic wiring diagram illustrating the principles of the invention in the aforesaid Hoskinson copending application;

FIG. 2 is a wiring diagram illustrating the principles of the present invention; and FIGS. 3A–6B are wave diagrams showing various sustain characteristics.

DETAILED DESCRIPTION

Turning now in greater particularity to the drawings, and first to FIG. 1, there will be seen a somewhat simplified circuit illustrating the principles of the invention in the aforesaid Hoskinson copending application. A field effect transistor (FET) 10 has a variable duty cycle digital waveform applied thereto on a line 12 under a manually presettable control, as on an electric organ. The drain of the FET 10 is connected to B+, while the source is connected through a resistor 14 (which may be an internal characteristic of the geometry of the FET 10) to a junction point 16. The junction point is connected to a capacitor 18, which capacitor is connected to ground or an equivalent reference potential. The average or effective rate at which current is conducted through the FET 10 depends on the duty cycle of the digital wave applied on the line 12 and the geometry of the FET, thereby controlling the charge rate of the capacitor 18.

A second FET 20 has a variable duty cycle wave applied to a line 22 connected to the control element or gate of the FET. The drain is connected through a resistor 24 (which again may be an internal characteristic of the FET 20) to the junction point 16. The source of the FET 20 is connected to ground or other suitable reference potential similar to the situation with the capacitor 18.

The junction point 16 is connected to the control element or gate of a third FET 26. An input frequency f represented by the square wave 28 in the diagram is connected to the drain of the third FET 26. The wave shape 28 represents an electrical wave corresponding to a musical tone. The source of the third FET 26 has an output at 30 on which the frequency f appears enveloped in amplitude by the state of charge of the capacitor 18.

The foregoing circuit comprises a part of an electronic keyboard instrument such as an organ which has keying circuits represented generally at 31 and including the usual keys and key switches for control of the musical electrical waves such as 28. The keying circuits are interconnected with attack and decay controls 33 which control the attack and decay lines 12 and 22.

In a percussive mode of playing a musical tone is desired to have a fast attack and a long decay. The wave shape 32 in FIG. 3A is representative thereof, having a fast attack portion 34, and a slow or long decay portion 36. In accordance with the circuit of FIG. 1, all of which is embodied in an LSI chip as disclosed in the copending patent application of Harold O. Schwartz and Dennis E. Kidd filed June 20, 1978 under Ser. No. 917,313 assigned to the same assignee as the present application, namely The Wurlitzer Company of DeKalb, Ill. with the exception of the capacitor 18, the charge of the capacitor 18 producing the rapid attack 34 is through the FET 10. A relatively high duty cycle applied to the control element of this FET produces rapid charging as is desired to produce the rapid attack portion 34 of the curve. Discharge is effected through the FET 20, and a relatively low duty cycle applied thereto is desired to effect slow discharge of the capacitor 18, thereby producing the long sustain curve 36. However, as noted heretofore, it may be desired to produce an initial slow decay (long sustain) followed by a very rapid decay as is shown in a+ FIG. 6A wherein the rapid decay is represented by the broken line 68 effective upon key release. This is effected in accordance with the prensent invention by means of the circuit shown in FIG. 2.

An LSI chip 40 is shown in part in FIG. 2. At the top right portion thereof there are shown three outputs 16', 16", and 16'''. Each such output point corresponds to the junction point 16 for a particular tone generator. In accordance with the present illustrative embodiment of the invention there are three tone generators for the LSI chip 40, each a square wave, i.e., 50% duty cycle, as shown in 28 in FIG. 1. Hence, there are three connections or chip pins 16', 16", and 16''', each corresponding to the junction point 16 of FIG. 1. The sustain capacitor is of too large a value to be contained internally of the chip and hence is an external component. In FIG. 2 there are three capacitors 18', 18", and 18''' respectively corresponding to the first 50% duty cycle wave, the second 50% duty cycle wave, and the third 50% duty cycle wave. It will be understood that the labeling of the LSI chip in this connection is for reference only, and that the waves appear at the output points or pins labeled 30 and 30a (in correspondence to FIG. 1). As will be understood the variable duty cycle wave applied to the decay control line 22 is for purposes of the present invention set for a low percentage duty cycle so that the discharge path for the capacitor 18 in each instance is of low resistance for only a very small percentage of the time, whereby to produce the long sustain curve 36.

The LSI chip 40 also is provided with connections 16'a, 16"a, and 16'''a corresponding to a 12.5% duty cycle wave and having separate attack and decay controls among the attack and decay controls 33 as compared with the 50% duty cycle waves. The decay controls are set to render the decay path effective upon key release. As originally designed and in accordance with the aforesaid Hoskinson copending patent application, there would be attack and decay capacitors connected to the connections or pins 16'a, 16"a and 16'''a, as was done with the 50% duty cycle pins or connections. However, in accordance with the present invention these three outputs 16'a, and 16"a, 16'''a are respectively connected to junction points 42, 44 and 46. A diode 48 has the anode thereof connected to the output connection or terminal 16' with the cathode thereof connected to the junction 42. Diodes 50 and 52 are similarly respectively connected between output connection or pin 16", and terminal 44, and between output connection or pin 16''' and junction 46.

A diode 54 has its cathode connected to the junction 42 and its anode connected to a junction 56. A diode 58 is similarly connected between the junction 44 and the junction 56, while another diode 60 is similarly connected between the junction 46 and the junction 56. The junction 56 is connected to one side of a damper switch 62, the other side of which is connected to a positive DC potential V+.

In a percussive play mode of the 50% duty cycle wave the attack and decay controls have been adjusted to provide a fast attack and a long sustain or slow decay for the 50% duty cycle waves, in accordance with the wave diagram of FIG. 3A. The attack and decay controls for the 12.5% duty cycle wave are set for the sustain mode of operation and are adjusted for fast attack and fast decay (short sustain).

With the damper switch 62 closed the positive voltage source acting through the diodes 54, 58 and 60 will back bias the diodes 48, 50 and 52 so that these latter diodes will not conduct. Accordingly, the sustain follows the long curve 36. However, with the damper switch open the corresponding attack control of the 12.5% duty cycle circuit will back bias one of the corresponding diodes either 48, 50 or 52 for the duration of the key held active (down). Thus, the capacitors 18', 18", and 18''' will discharge through their discharge circuit internally of the LSI chip 40, i.e. through the resistor and FET corresponding to the resistor 24 and FET 20 of FIG. 1. However, as soon as a key is released the corresponding decay control of the 12.5% duty cycle circuit will be activated to cause rapid decay along the broken line 68 of the curve in FIG. 6A thus producing a rapid decay following key release.

Different wave shapes can be produced according to whether the damper switch is closed or open, and depending on the relative potentials of B+ and V+. Wave shapes are shown in FIGS. 3A–6B to which reference should now be made. In FIG. 3A there is shown the wave shape previously mentioned wherein the damper switch is closed and the key is hit and promptly released. The wave rises rapidly at 34 and decays slowly at 36 when B+=V+. However, if B+ is greater than V+, as is shown in FIG. 3B, the wave rises rapidly at 34, as it does in all cases in the present example, and then drops rapidly at 64 until the capacitor has discharged to a point where its potential is equal to V+, whereupon a slow decay continues at 66, generally similar to but at a lower level as compared with the wave portion 36.

In FIG. 4A the wave shape is shown in the case where B+=V+ and the damper switch is held closed, the key being hit and held. In this instance the wave comprises the rapid rise 34 and the slow decay 36, exactly the same as 3A. In the case where B+ is greater than V+, but the key is held closed, the wave shape as shown in FIG. 4B comprises the rapid rise 34 and the slow decay 36, exactly the same as in FIGS. 3A and 4A.

FIGS. 5A and 5B illustrate wave shapes in which the damper switch is open, whereby there is no back biasing of the diodes 48, 50 or 52, and wherein the key is hit and then released. The wave shape here again has the rapid rise portion, and whether B+=V+(5A), or B+ is greater than V+(5B) there is a rapid decay curve 64 which follows the initial decay portion of FIG. 3B, but which continues on down to the base line in the absence of back biasing of the diodes, as just mentioned.

Finally, in the case where the damper switch is open, and the key is hit and held, the waves produced, whether B+=V+, or B+ is greater than V+, both have the rapid rise portion 34 and the slow decay 36, exactly as in FIG. 3A and FIGS. 4A and 4B. In the event that the key is released after being held for awhile, then there is a rapid decay as indicated at 68, in either FIG. 6A or 6B.

The illustrated number of three generators per chip with output connections therefor at 50% duty cycle and at 12.5% duty cycle is not of importance relative to the present invention. There could equally well be any number of generators between 1 and 12, or even more, per chip. The important thing is that there is at least one charge and discharge capacitor exterior of the chip for the desired (such as 50%) duty waveform, and a connection designed for such an external capacitor for the other (such as 12.5%) duty wave shape. The latter capacitor is omitted in the present case with the internal discharge circuit of the chip with 12.5% duty cycle wave being used as a secondary discharge path for the 50% duty cycle wave capacitor to provide a dual slope discharge curve.

The specific example of the invention as herein shown and described is for illustrative purposes only. Various changes will no doubt occur to those skilled in the art, and will be understood as forming a part of the present invention insorfar as they fall within the spirit and scope of the appended claims.

The invention is claimed as follows:

1. Envelope control for an electronic musical instrument comprising a plurality of controlled gates for respectively conducting a like plurality of electric signals corresponding to respective musical tones, a like plurality of electrical energy storing means respectively connected to said gates respectively to control the conductivity thereof according to the level of electrical energy respectively stored in each of said storing means, a like plurality of first means for respectively supplying electrical energy to said storing means and a like plurality of first discharging means for respectively discharging electrical energy from said storing means, a like plurality of second discharging means for respectively discharging electrical energy from said storing means, a like plurality of means respectively interconnecting said electrical energy storing means and said second discharging means and each including gate means, and means for rendering said gate means selectively conductive or non-conductive whereby to render said second discharging means effective or ineffective in respectively discharging said electrical energy storing means.

2. Envelope control as set forth in claim 1 wherein said gate means comprises a diode poled to conduct from said energy storing means, an oppositely poled diode connected to the first mentioned diode, a voltage source connected to said oppositely poled diode, and a switch interconnected with said voltage source and said oppositely poled diode and effective upon switch closure to bias the first mentioned diode to non-conduction.

3. Envelope control as set forth in claim 1 and further including keying means including means for rendering said second discharging means effective upon key release.

4. Envelope control for an electronic musical instrument comprising a plurality of discrete keying means and a like plurality of discrete electrical energy storing means and further comprising an LSI chip including a like plurality of controlled gates for respectively conducting electric signals corresponding to musical tones, each such gate having a control element and an output element, said LSI chip having a first like plurality of pin-outs each of which is connected to a respective gate and a respective electrical energy storing means, said LSI chip having a second like plurality of pin-outs each of which is connected to a respective gate output element and to a utilization circuit, said LSI chip further having a like plurality of first means for respectively supplying electrical energy to said first plurality of pin-outs and first discharging means respectively connected to said second plurality to pin-outs for discharging electrical energy from said electrical energy storing means, a like plurality of second means on said clip for discharging electrical energy, said chip having a third like plurality of pin-outs, means including a like plurality of discrete gates respectively connecting said plurality of energy storing means to said third plurality of pin-outs and means for rendering said gates selectively conductive or non-conductive whereby to render said second plurality of discharge means respectively effective or ineffective in discharging said electric energy storing means.

5. Envelope control as set forth in claim 4 wherein each of said discrete gate means comprises a diode connected between said energy storage means and the respective third pin-out and poled to conduct from said storing means to said second discharging means, and wherein each means for rendering said gate means respectively conductive or non-conductive comprises a diode oppositely poled and a switch connected to an electrical potential for back biasing each respective first mentioned diode to prevent conduction thereof or for not back biasing each first mentioned diode to allow conduction thereof.

6. Envelope control as set forth in claim 4 wherein said chip further includes a like plurality of keying means and a like plurality of means for respectively rendering said second discharging means effective upon key release.

7. Envelope control as set forth in claim 4 wherein said LSI chip includes a like plurality of tone generators respectively supplying said electric signals and respectively connected to said controlled gates.

* * * * *